(12) United States Patent
Hoang-Dinh et al.

(10) Patent No.: US 8,287,626 B2
(45) Date of Patent: Oct. 16, 2012

(54) METHOD FOR PURIFYING A GAS MIXTURE CONTAINING ACID GASES

(75) Inventors: Viep Hoang-Dinh, Bizanos (FR); Damien Roquet, Fontenay-sous-Bois (FR); Kenza Habchi-Tounsi, Rueil-Malmaison (FR); Olivier Chazelas, Montgeron (FR); Claire Weiss, Suresnes (FR)

(73) Assignee: Total S.A., Courbvoie (FR)

( * ) Notice: Subject to any disclaimer, the term of this patent is extended or adjusted under 35 U.S.C. 154(b) by 253 days.

(21) Appl. No.: 12/523,504

(22) PCT Filed: Jan. 18, 2008

(86) PCT No.: PCT/FR2008/000065
§ 371 (c)(1),
(2), (4) Date: Jul. 16, 2009

(87) PCT Pub. No.: WO2008/107550
PCT Pub. Date: Sep. 12, 2008

(65) Prior Publication Data
US 2010/0083696 A1 Apr. 8, 2010

(30) Foreign Application Priority Data
Jan. 19, 2007 (FR) ...................................... 07 00361

(51) Int. Cl.
*B01D 53/14* (2006.01)
(52) U.S. Cl. ................ 95/174; 95/179; 95/181; 95/183; 95/193; 95/209; 95/235; 95/236; 423/228; 423/229
(58) Field of Classification Search .................... None
See application file for complete search history.

(56) References Cited

U.S. PATENT DOCUMENTS

| 3,664,091 A | * | 5/1972 | Hegwer ........................... 95/161 |
| 3,837,143 A | * | 9/1974 | Sutherland et al. .............. 95/162 |
| 4,406,868 A | * | 9/1983 | Carter et al. ................... 423/228 |
| 4,551,158 A | * | 11/1985 | Wagner et al. .................. 95/175 |
| 4,773,921 A | * | 9/1988 | Elgue et al. ...................... 95/180 |
| 4,780,115 A | | 10/1988 | Ranke |
| 4,834,781 A | | 5/1989 | Grünewald et al. |
| 5,061,465 A | * | 10/1991 | Carter ............................ 423/229 |
| 5,820,837 A | * | 10/1998 | Marjanovich et al. ......... 423/220 |

(Continued)

FOREIGN PATENT DOCUMENTS
FR 2 573 671 A 5/1986

(Continued)

*Primary Examiner* — Duane Smith
*Assistant Examiner* — Pankti Patel
(74) *Attorney, Agent, or Firm* — Harness, Dickey & Pierce, P.L.C.

(57) ABSTRACT

A method for treating a gas mixture containing acid gases, including: contacting the gas mixture with an absorbing solution, to obtain a de-acidified gas mixture and an absorbing solution with acid gases. To regenerate the absorbing solution with acid gases, the absorbing solution is passed into a first regenerator at a first pressure, then the solution is passed into a second regenerator at a second pressure, and finally to a third regenerator at a third pressure, the third pressure being less than the second pressure which is less than the first pressure. The gases from the second and third regenerator are compressed and recycled to the first and second regenerator, respectively. Gases from the second and/or the third regenerator are drawn off to provide a gas mixture rich in hydrogen sulfide. Gases from the first regenerator are drawn off to provide a gas mixture rich in carbon dioxide.

17 Claims, 7 Drawing Sheets

U.S. PATENT DOCUMENTS

| | | | |
|---|---|---|---|
| 7,276,153 B2 * | 10/2007 | Wagner et al. | 208/240 |
| 2004/0057886 A1 * | 3/2004 | Paulsen et al. | 423/220 |
| 2004/0226441 A1 * | 11/2004 | Palmer | 95/235 |
| 2007/0028774 A1 * | 2/2007 | Rochelle | 95/236 |
| 2007/0221065 A1 * | 9/2007 | Aroonwilas et al. | 96/243 |
| 2008/0127831 A1 * | 6/2008 | Rochelle et al. | 96/181 |

FOREIGN PATENT DOCUMENTS

| | | |
|---|---|---|
| FR | 2 589 752 A1 | 5/1987 |
| FR | 2 896 244 | 7/2007 |
| WO | 2004/080573 A1 | 9/2004 |
| WO | 2007/083012 | 7/2007 |

* cited by examiner

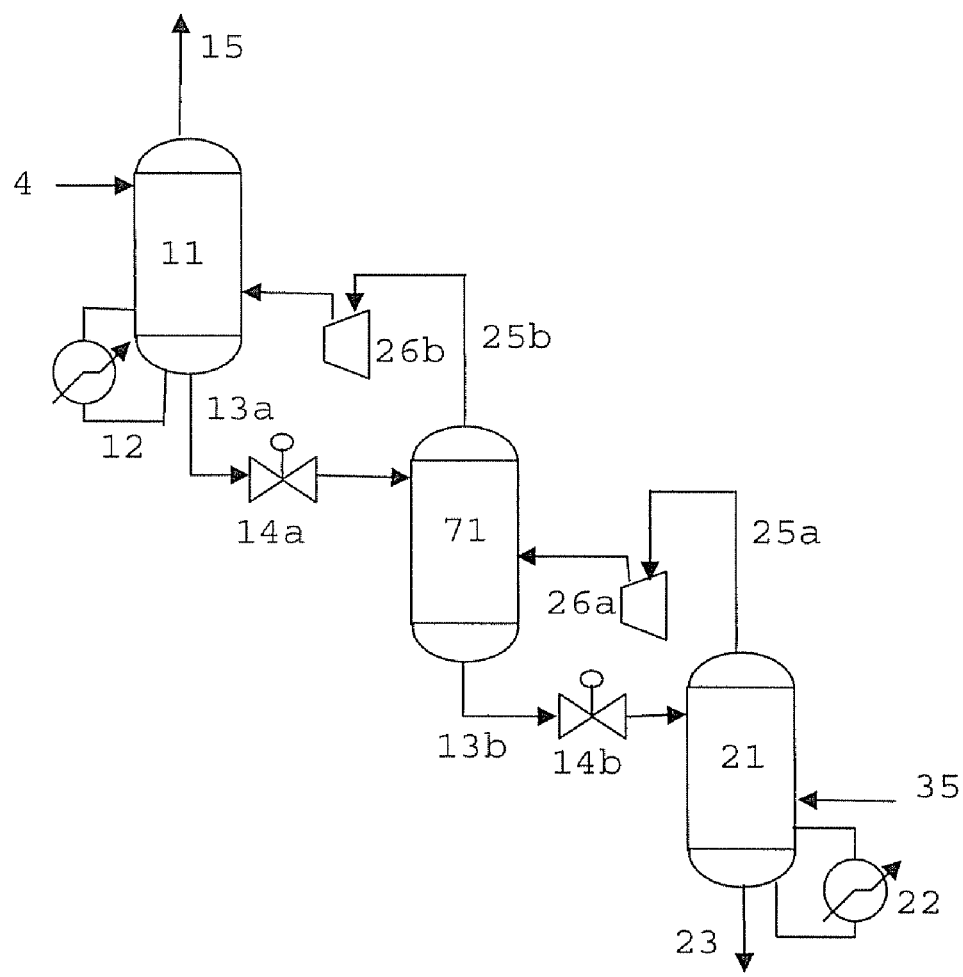
Figure 1 bis

METHOD FOR PURIFYING A GAS MIXTURE CONTAINING ACID GASES

CROSS-REFERENCE TO RELATED APPLICATIONS

This application is a National Phase Entry of International Application No. PCT/FR2008/000065, filed on Jan. 18, 2008, which claims priority to French Patent Application No. 07 00 361, filed on Jan. 19, 2007, both of which are incorporated by reference herein.

FIELD OF THE INVENTION

The present invention relates to a method for purifying a gas mixture (in particular a gas mixture based on hydrocarbons such as natural gas) containing acid gases, as well as to a suitable installation for applying this method.

BACKGROUND OF THE INVENTION

In the production of natural gas (mainly containing methane) or liquefied natural gas, it is necessary to purify said natural gas stemming from a deposit, from a certain number of contaminants, in first place those which are called "acid gases", i.e. mainly carbon dioxide ($CO_2$) and hydrogen sulfide ($H_2S$) but also mercaptans (R—SH), carbonyl sulfide (COS) and carbon disulfide ($CS_2$). Carbon dioxide and hydrogen sulfide may account for a significant portion of the gas mixture stemming from a natural gas deposit, typically from 3 to 70% (in molar concentration), the other acid gases being present in smaller amounts. Many processes presently exist for de-acidifying natural gas.

A first class of processes is that of physical absorption processes, wherein the acid gases are put into contact with an absorbing solution, the transfer of the acid gases into the absorbing solution being performed by affinity, i.e. promoted by thermodynamic equilibrium. Examples of compounds which may form such suitable absorbing solutions are polyethylene glycol dimethyl ether (the "Selexol" process from UOP), propylene carbonate (a process from Fluor Corporation), N-methyl-pyrrolidone (the "Purisol" process from Lurgi), methanol (the "rectisol" process from Lurgi) or morpholine derivatives (the "morphisorb" process from UHDE). Regeneration of the absorbing solution is carried out by successive expansions at decreasing pressures, without providing any energy.

A second class of processes is that of chemical absorption processes wherein the acid gases are put into contact with an absorbing solution, the transfer of the acid gases into the absorbing solution being carried out or accelerated by a chemical reaction. Examples of compounds which may form such suitable absorbing solutions, are potassium carbonate (the "Benfield" process from UOP) and especially an alkanolamine: notably monoethanolamine (MEA), diglycolamine (DGA), diisopropanolamine (DIPA), diethanolamine (DEA), methyldiethanolamine (MDEA), activated methyldiethanolamine and triethanolamine (TEA), as well as sterically hindered amines. Regeneration of the absorbing solution is mainly carried out in a heated regeneration column.

Mention may also be made of a class of mixed physico-chemical absorption processes of such as for example the so-called "Sulfinol" process from Shell, wherein the absorbing solution is a mixture of sulfolane, water and an amine. The physical absorption processes have the drawback of being costly, not very widespread, of low efficiency when the partial pressure of acid gases is not very high and they also have the drawback of also absorbing a portion of the hydrocarbons. Moreover, the chemical or physico-chemical absorption processes have the drawback of requiring a significant provision of energy at the stage for regenerating the absorbing solution.

Conventionally, acid gases are fed to a Claus converter where the $H_2S$ is converted to sulfur but where the associated $CO_2$ is released into the atmosphere. Therefore, there is a real need for a method for purifying gas mixtures containing acid gases which, firstly allows the $CO_2$ stream to be produced separately from the $H_2S$ stream, and secondly is both as efficient and more economical in energy and in solvent flow rate as compared with the existing processes.

SUMMARY OF THE INVENTION

First, the subject matter of the invention is a method for treating a gas mixture containing acid gases, comprising:
  contacting the gas mixture with an absorbing solution, by means of which a de-acidified gas mixture and an absorbing solution loaded with acid gases may be obtained; and
  regenerating the absorbing solution loaded with acid gases;
  wherein the regeneration comprises the following steps:
    passing the absorbing solution in a first regenerator at a first pressure; and then
    passing the absorbing solution in a second regenerator at a second pressure, less than the first pressure; and
    compressing the gases from the second regenerator and recycling the thereby compressed gases to the first regenerator.
Regeneration further comprises the following steps:
    subsequently to passing into the second regenerator, passing the absorbing solution in a third regenerator at a third pressure less than the second pressure; and
    compressing the gases from the third regenerator and recycling the thereby compressed gases to the second regenerator.

According to one embodiment, the first pressure is comprised between 5 and 20 bar gage pressure, the second pressure is comprised between 2 and 6 bar gage pressure, and the third pressure is comprised between 0.5 and 1.5 bar gage pressure. According to one embodiment, the first and/or the second and/or the third regenerator, if present, are heated. According to one embodiment, the absorbing solution is not boiling in the first regenerator and the second regenerator and is boiling in the third regenerator.

According to one embodiment, during the step for contacting the gas mixture with the absorbing solution, a portion of the absorbing solution is drawn off, cooled and put back into contact with the gas mixture. According to one embodiment, the absorbing solution undergoes flash expansion before passing into the first regenerator. According to one embodiment, a portion of the absorbing solution obtained after the flash expansion and/or a portion of the absorbing solution obtained after passing into the first regenerator and/or a portion of the absorbing solution obtained after passing into the second regenerator is cooled and put into contact with the gas mixture.

According to one embodiment, the gas mixture is based on hydrocarbons and preferably is natural gas. According to one embodiment, at least a portion of the gases from the second and/or the third regenerator is drawn off in order to provide a gas mixture rich in hydrogen sulfide and at least a portion of the gases from the first regenerator is drawn off in order to provide a gas mixture rich in carbon dioxide. According to one embodiment, the gas mixture rich in carbon dioxide is put into contact with at least a portion of the absorbing solution from the second or third regenerator, in order to provide a gas mixture very rich in carbon dioxide, the absorbing solution obtained after this contacting, then undergoing regeneration or being cooled and put into contact with the gas mixture.

According to one embodiment, the absorbing solution comprises:
- at least one alkanolamine, preferably selected from the group of diethanolamine, methyldiethanolamine, and activated methyldiethanolamine;
- optionally a $C_2$-$C_4$ thioalkanol, preferably thiodiglycol; and
- water.

According to one embodiment, the absorbing solution comprises:
- at least one alkanolamine, preferably selected from the group of diisopropanolamine and methyldiethanolamine;
- optionally sulfolane; and
- water.

According to one embodiment, the method further comprises the following step:
dehydration of the de-acidified gas mixture.

The subject matter of the invention is also an installation for treating a gas mixture containing acid gases, comprising:
- an absorption column;
- a gas mixture supply conduit feeding the foot of the absorption column;
- an absorbing solution supply conduit feeding the head of the absorption column;
- a first regenerator, an inlet of which is connected to an outlet at the foot of the absorption column via a conduit for withdrawing a rich absorbing solution;
- a second regenerator;
- a conduit for conveying liquid from the first regenerator to the second regenerator;
- a conduit for conveying gas from the second regenerator to the first regenerator;
- a compressor located on the conduit for conveying gas from the second regenerator to the first regenerator.

The aforementioned installation further comprises:
- a third regenerator;
- a conduit for conveying liquid from the second regenerator to the third regenerator;
- a conduit for conveying gas from the third regenerator to the second regenerator;
- a compressor located on the conduit for conveying gas from the third regenerator to the second regenerator.

According to one embodiment, the installation comprises one or more of the following items:
- a reducing valve located on the conduit for withdrawing a rich absorbing solution;
- cooling means and a pump located on the absorbing solution supply conduit;
- a reducing valve located on the conduit for conveying liquid from the first regenerator to the second regenerator;
- a reducing valve located on the conduit for conveying liquid from the second regenerator to the third regenerator.

According to one embodiment of the aforementioned installation, the first regenerator and/or the second regenerator and/or the third regenerator are provided with heating means.

According to one embodiment, the aforementioned installation comprises:
cooling means;
- a absorbing solution drawing off conduit connected to the absorption column and feeding the cooling means;
- a conduit for injecting a cooled absorbing solution, connected at the outlet of the cooling means and feeding the absorption column.

According to one embodiment, the aforementioned installation comprises between the absorption column and the first regenerator:
a flash expansion chamber.

According to one embodiment, the aforementioned installation comprises:
- a conduit for withdrawing a gas mixture rich in hydrogen sulfide, connected at the outlet of the second regenerator and/or of the third regenerator; and
- a conduit for withdrawing a gas mixture rich in carbon dioxide, connected at the outlet of the first regenerator.

According to one embodiment, the aforementioned installation comprises:
- an additional absorption column, fed at the bottom by the conduit for withdrawing a gas mixture rich in carbon dioxide;
- an additional absorbing solution supply conduit feeding the head of the additional absorption column;
- a conduit for withdrawing a gas mixture very rich in carbon dioxide, connected at the head outlet of the additional absorption column; and
- a conduit for withdrawing an absorbing solution connected at the foot outlet of the additional absorption column and optionally feeding the first regenerator.

According to one embodiment, the aforementioned installation comprises:
- an absorbing solution bypass conduit fed by a first bypass, a second bypass, a third bypass, a fourth bypass or several of the latter, each bypass being provided with cooling means and pumps, wherein:
  - the first bypass is connected at the outlet of the flash expansion chamber;
  - the second bypass is connected at the outlet of the first regenerator;
  - the third bypass is connected at the outlet of the second regenerator; and
  - the fourth bypass is connected at the outlet of the additional absorption column.

The subject matter of the invention is also a method for producing liquefied natural gas comprising:
- a step for treating natural gas containing acid gases according to the aforementioned method; and
- a step for liquefying the treated natural gas.

With the present invention it is possible to overcome the drawbacks of the state of the art. More particularly, it provides a method for purifying a gas mixture (in particular natural gas) containing acid gases, which is both as efficient and less costly in energy as compared with the existing processes. This is mainly accomplished by developing a staged regeneration of the absorbing solution, the regeneration being carried out in three (or even more) successive regenerators with decreasing pressures, the gases from each regenerator being recompressed and reinjected into the regenerator immediately located upstream. This upstream reinjection of recompressed gases provides a portion of the energy required for the regeneration and savings may be made on heating the regenerators. Achieved global energy savings as compared with conventional regeneration are of the order of 10%.

According to certain particular embodiments, the invention also has the advantageous characteristics listed below:
A portion of the acid gases from the regeneration (for example the acid gases from the first regenerator) is directly available at a high pressure. Thus, if desired, one may proceed with reinjecting the acid gases into the deposit, at high pressure, while achieving savings at the recompression of the acid gases.

Staged regeneration causes gradual enrichment of the acid gases in $H_2S$. Selective separation of the acid gases may then be carried out. The recovered acid gases at the outlet of the regenerator(s) located downstream are rich in $H_2S$, whereas the acid gases recovered at the outlet of the regenerator(s) located upstream are rich in $CO_2$. This selective separation is advantageous if it is desired to specifically treat the hydrogen sulfide, since the treatment cost is reduced in the absence of any significant contamination of the hydrogen sulfide by carbon dioxide. Moreover, at this level, a gain is also achieved in terms of absence of "contamination" by hydrocarbons.

It is possible to produce a concentrated $CO_2$ stream which can be put to practical use, for instance for reinjection during assisted production of oil.

With the staged regeneration according to the invention, it is possible to do without a large size low pressure regenerator which is required in the standard regeneration of chemical absorbing solutions. This gain may be particularly significant for off-shore applications.

The method according to the invention lends itself to optimum adjustment of the regeneration by means of which the flow rate of absorbing solution may be limited as much as possible.

BRIEF DESCRIPTION OF THE DRAWINGS

FIG. 1 bis illustrates a detail of the installation, according to a particular embodiment.

FIG. 4 corresponds to a ratio of $CO_2/H_2S$ volume concentrations at the inlet of the system equal to 0.5.

FIG. 5 corresponds to a ratio of $CO_2/H_2S$ volume concentrations at the inlet of the system, equal to 1.

FIG. 6 corresponds to a ratio of $CO_2/H_2S$ volume concentrations at the inlet of the system, equal to 3.

FIG. 7 corresponds to a ratio of $CO_2/H_2S$ volume concentrations at the inlet of the system, equal to 5.

FIG. 8 corresponds to a ratio of $CO_2/H_2S$ volume concentrations at the inlet of the system equal to 8.

DETAILED DESCRIPTION OF EMBODIMENTS

The invention is now described in more detail and in a non-limiting way in the description which follows.

Gas Treatment Installation

Figure 1:
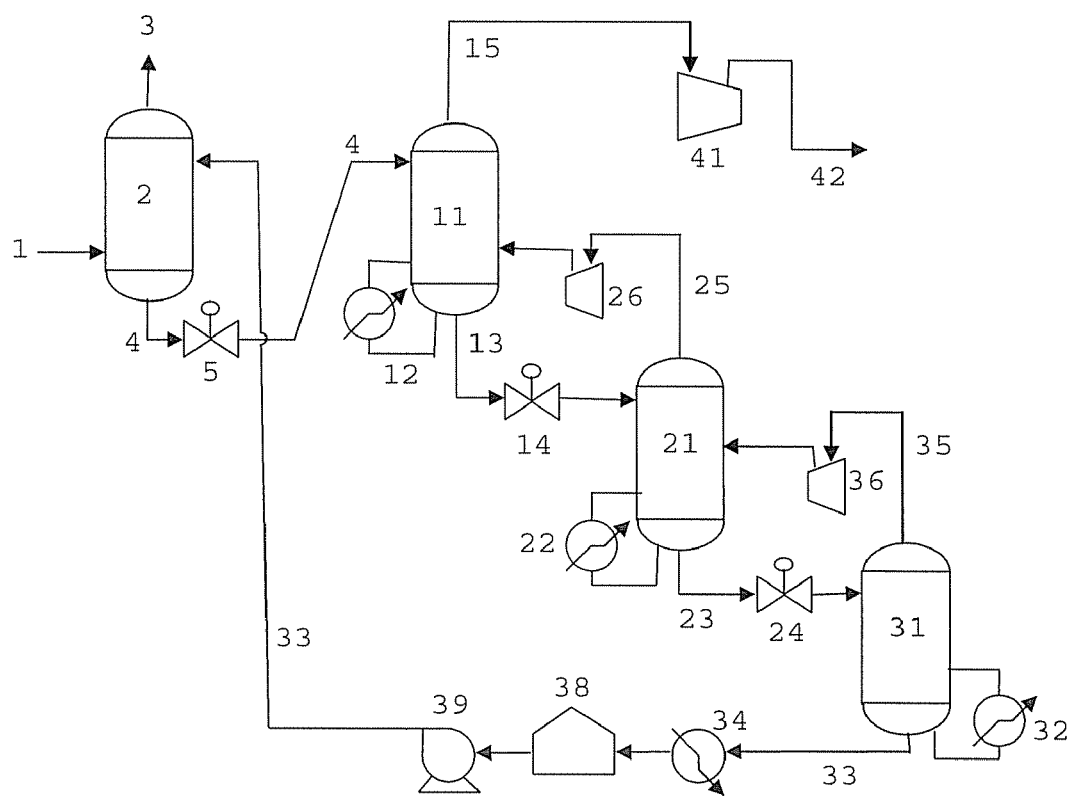
FIG. 1 schematically illustrates an embodiment of an installation according to the invention.

With reference to FIG. 1, a gas treatment installation according to the invention mainly comprises an absorption column 2, and at least three regenerators, i.e. in the present case a first regenerator 11 (or high pressure regenerator), a second regenerator 21 (or medium pressure regenerator) and a third regenerator 31 (or low pressure regenerator). The absorption column 2 may be a customary column in the field, notably a plate column or a packed column. The installation may also comprise two or more absorption columns. Each regenerator is a contactor. It may consist in a simple container provided with means for spraying an absorbing solution or, preferably, in a plate column (or a packed column). As an example, the first regenerator and the second regenerator may include 4-6 or even 10 plates, and the third regenerator may include 10-15 or even 20 plates.

The absorption column 2 is fed at its foot by a gas mixture supply conduit 1. A treated gas withdrawal conduit 3 is connected at the head outlet of the absorption column 2. It may feed complementary treatment means (notably dehydration means) or means for storing or conveying gas, which are not illustrated here.

All the items described here, except for the absorption column 2, the gas mixture supply conduit 1 and the treated gas withdrawal conduit 3, are part of the circuit for regenerating the absorbing solution (and for treating acid gases). An absorbing solution supply conduit 33 is connected at the head inlet of the absorption column. A rich absorbing solution withdrawal conduit 4 is connected at the foot outlet of the absorption column 2.

This rich absorbing solution withdrawal conduit 4 feeds the head of the first regenerator 11. A reducing valve 5 (or instead of the latter an assembly consisting of a turbine and a reducing valve in parallel) is provided on this rich absorbing solution withdrawal conduit 4. The first regenerator 11 is provided with a heating means 12. A conduit 15 for withdrawing acid gases, still called in certain embodiments a conduit for withdrawing a gas mixture rich in carbon dioxide, is connected at the head outlet of the first regenerator 11. At the foot outlet of the first regenerator 11 is connected a conduit 13 for conveying a liquid from the first regenerator 11 to the second regenerator 21, which is thus fed at the head. A reducing valve 14 is preferably provided on this conduit 13 for conveying a liquid.

The second regenerator 21 is also provided with a heating means 22. At the head output, of the second regenerator 21 is connected a conduit 25 for conveying gas from the second regenerator 21 to the first regenerator 11. A compressor 26 is provided on said gas conveying conduit 25. At the foot outlet of the second regenerator 21 is connected a conduit 23 conveying a liquid from the second regenerator 21 to the third regenerator 31, which is thus fed at the head. A reducing valve 24 is preferably provided, on this liquid conveying conduit 23.

The third regenerator 31 is also provided with a heating means 32 (a reboiler here). At the head outlet of the third regenerator 31 is connected a conduit 35 for conveying gas from the third regenerator 31 to the second regenerator 21. A compressor 36 is provided on said gas conveying conduit 35. At the foot outlet of the third regenerator 31 is connected the aforementioned absorbing solution supply conduit 33.

Cooling means 34, a storage tank 38 (optional) and a pump 39 are preferably provided successively along the absorbing solution supply conduit 33. The cooling means 34 preferably comprise a heat exchanger with an external medium of the water, air or seawater type and optionally upstream from this exchanger, a heat exchanger with the absorbing solution (the heat exchange being for example performed with the flowing liquid in the rich absorbing solution withdrawal conduit 4), for energy optimization purposes. The pump 39 may be replaced with a set of two or more pumps placed in series. Regarding the conduit 15 for withdrawing acid gases, it may be cooled and may feed downstream compression means 41, at the outlet of which is connected a conduit 42 for withdrawing compressed acid gases. The latter may be cooled and may feed complementary treatment means, well reinjection means or other means.

Among the modifications which may be made to this installation without departing from the scope of the invention, the following alternatives may notably be listed:

the possibility of dispensing with one or more of the heating means 12, 22, 32 associated with the regenerators 11, 21, 31; this however is generally a degraded version of the installation.

the possibility of providing for the compressors 26, 36 located on the gas conveying conduits 25, 35 to be equipped with a cooler at the inlet, if this is required for them to operate properly; it is also possible to split each compressor 26, 36 into two successive compressors with a cooling means between both of them. In the case of the presence of a cooler at the inlet of the compressor, it is advantageous to provide an intermediate chamber in order to separate the condensation water (the condensation water may then be redirected towards the absorbing solution reservoir or towards the regenerator from which stems the gas flow to be compressed). The cooling means may be a heat exchanger (with an external medium) or optionally a contactor with the rich amine from the preceding stage. The latter case is more particularly illustrated in FIG. 1 bis as regards the example of splitting the compressor 26 into two. The conduit 25 for conveying gas from the second regenerator 21 to the first regenerator 11, then consists of a first portion 25a on which is placed a first compressor 26a; and of a second portion 25b on which is placed a second compressor 26b. A contactor 71 is provided between the first portion 25a and the second portion 25b. Also the conduit 13 for conveying a liquid from the first regenerator 11 to the second regenerator 21, then consists of a first portion 13a on which is placed a first reducing valve 14a; and of a second portion 13b on which is placed a second reducing valve 14b. The contactor 71 is located between the first portion 13a and the second portion 13b. Thus, the contactor 71 is fed at the inlet by the first portion 13a of the liquid conveying conduit (at the head) and by the first portion 25a of the gas conveying conduit (at the foot); and it feeds at the output the second portion 13b of the liquid conveying conduit (at the foot) and the second portion 25b of the gas conveying conduit (at the head). Cooling within the contactor 71 is performed by direct contact between the gas and the liquid. The contactor 71 may consist in a simple container provided with means for spraying an absorbing solution or, preferably, in a plate column (or a packed column).

Also, a cooling system may be provided at the inlet of the downstream compression means 41. It is possible to provide a flash expansion system upstream from the first regenerator, as this is described below in connection with FIG. 3.

Figure 2:
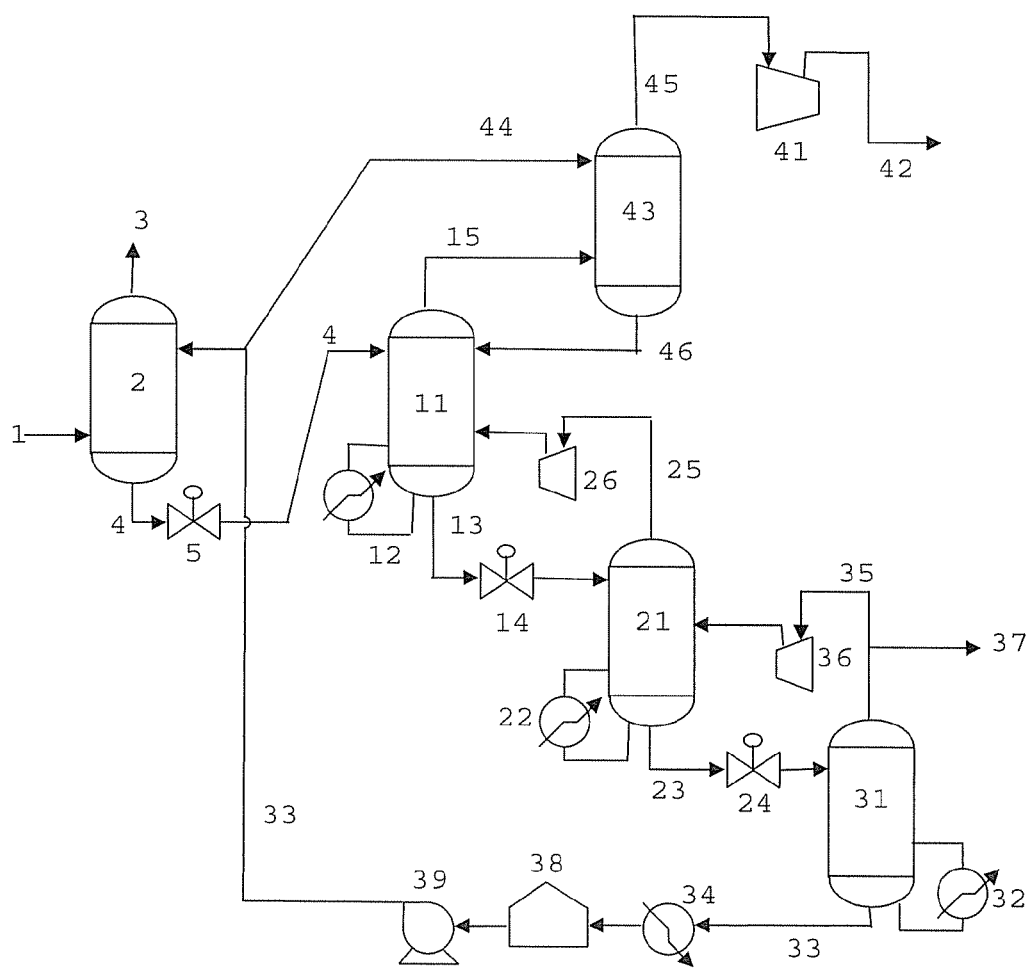
FIG. 2 schematically illustrates another embodiment of an installation according to the invention.

Now referring to FIG. 2, the installation described earlier may simply be modified by adding a conduit 37 for withdrawing a gas mixture rich in hydrogen sulfide, connected either on the conduit 25 for conveying a gas from the second regenerator 21 to the first regenerator 11, or preferably and as illustrated here, on the conduit 35 for conveying a gas from the third regenerator 31 to the second regenerator 21, upstream or downstream from the compressor 36, or even on both conduits at a time. Still with reference to FIG. 2, another modification may be made, preferably together with the modification described earlier. This is the presence of an additional absorption column 43, present in the absorbing solution regeneration circuit.

More specifically, the additional absorption column 43 (which may be of a type described above in connection with the absorption column 2) is fed at the foot by the conduit 15 for withdrawing a gas mixture rich in carbon dioxide which is cooled and may be compressed, and at the head by an additional absorbing solution supply conduit 44. Preferably, the additional absorbing solution supply conduit 44 stems from a connection on the absorbing solution supply conduit 33. This additional absorbing solution supply conduit 44 may also stem from a connection on the conduit 23 for conveying a liquid from the second regenerator 21 to the third regenerator 31, after passing through cooling means and a pump (a case not shown here). At the head output of the additional absorption column 43 is connected a conduit 45 for withdrawing a gas mixture very rich in carbon dioxide, which feeds the downstream compression means 41 described above. At the foot outlet of the additional absorption column 43 is connected a conduit 46 for withdrawing an absorbing solution which feeds the head of the first regenerator 11.

Figure 3:
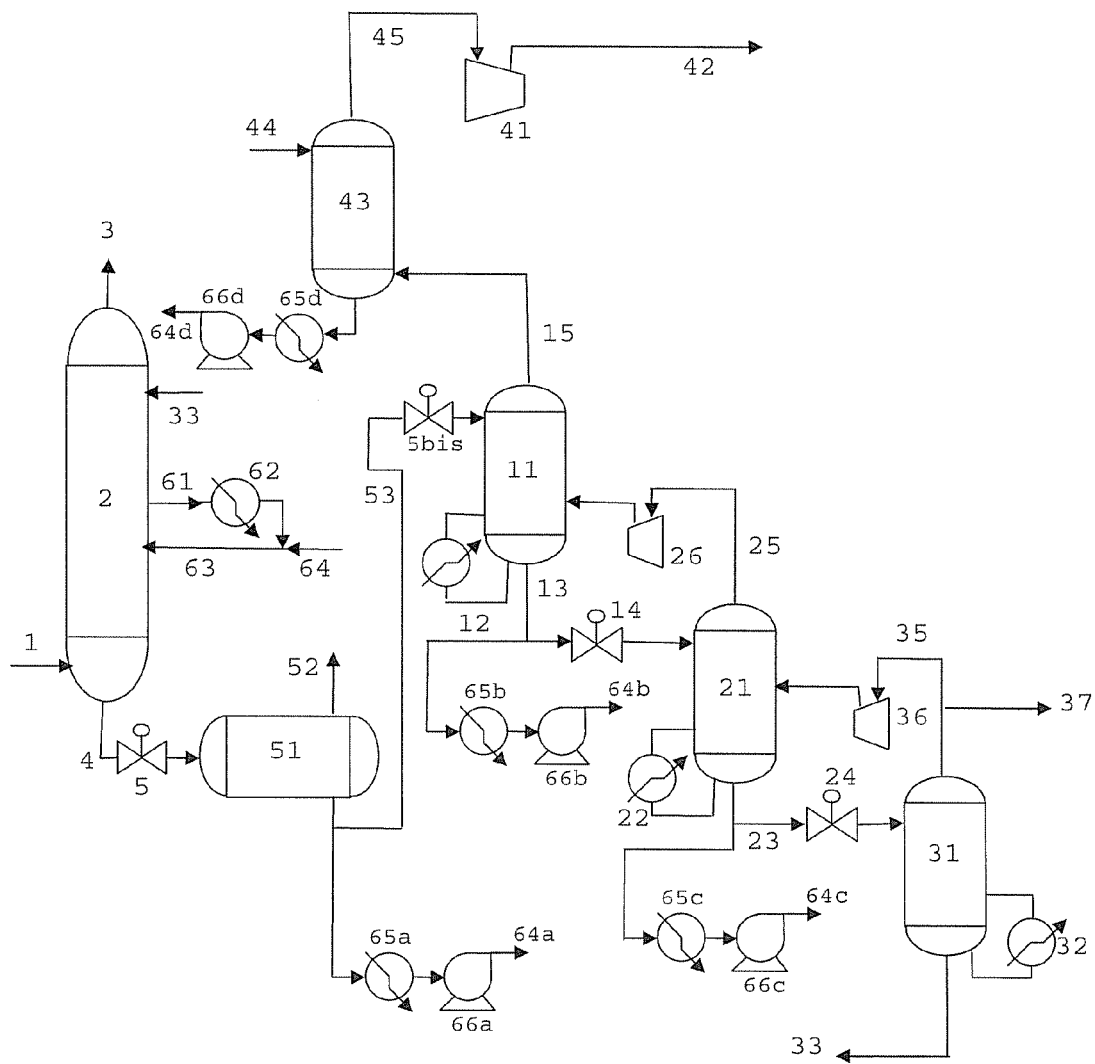
FIG. 3 schematically further illustrates another embodiment of an installation according to the invention.
Figure 4:
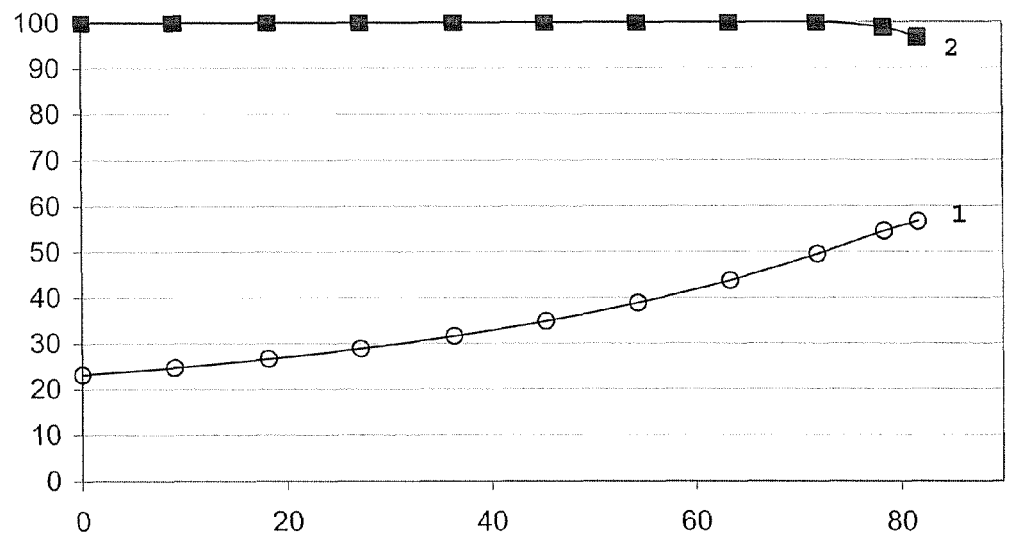
FIGS. 4-8 are diagrams illustrating the purity of the $CO_2$-rich fraction taken off at the outlet of the first regenerator (curve 1) and of the $H_2S$-rich fraction taken off at the outlet of the third regenerator (curve 2) depending on the amount taken off at the outlet of the third regenerator, in the case of the embodiment of FIG. 2 but in the absence of the absorption column 43. The x-axis represents the $H_2S$ percentage drawn off via the withdrawal conduit 37, relatively to the total amount of $H_2S$ present in the system; the y-axis shows the $CO_2$ ($H_2S$ respectively) volume in the $CO_2$-rich fraction from the withdrawal conduit 15 (in the $H_2S$-rich fraction from the withdrawal conduit 37, respectively).
Figure 5:
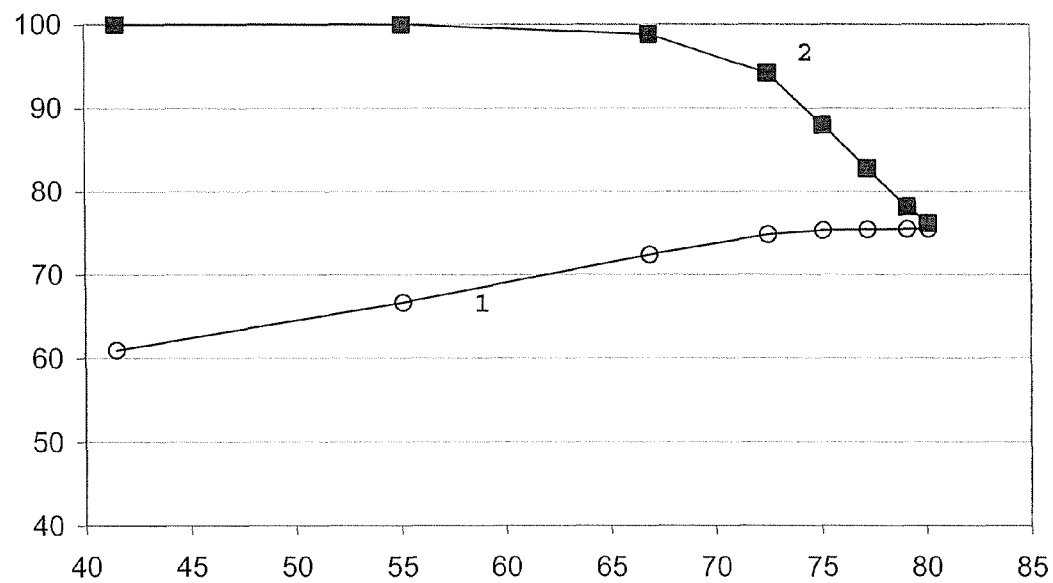
Figure 6:
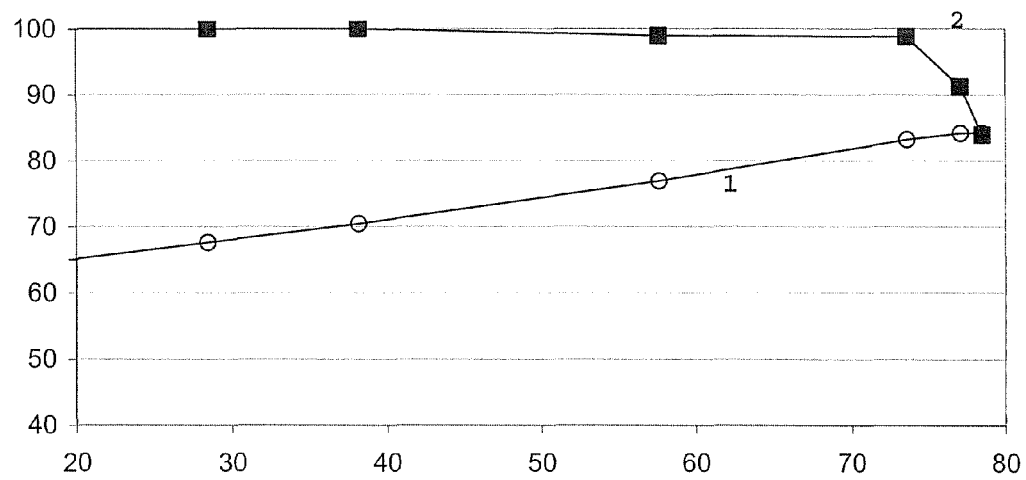
Figure 7:
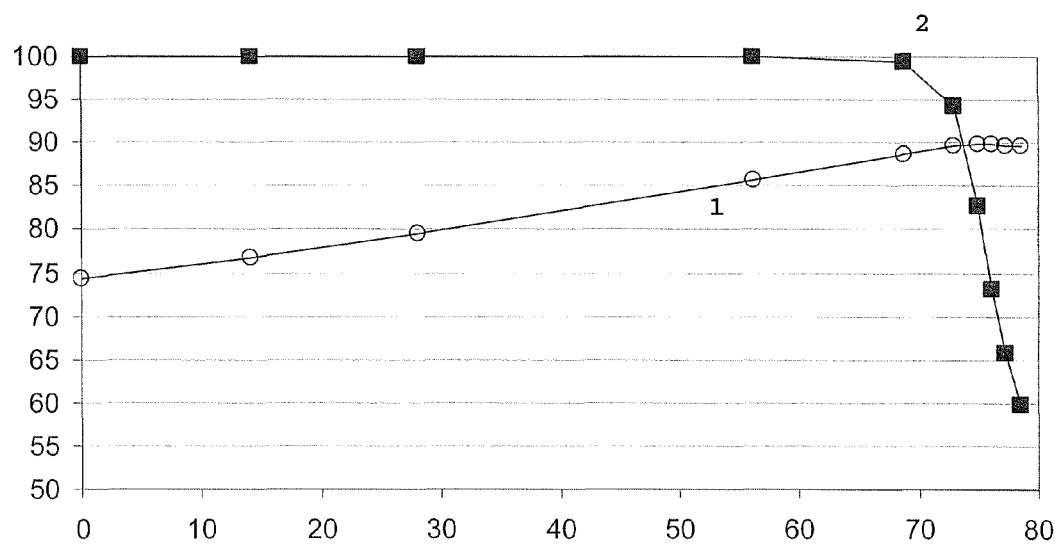
Figure 8:
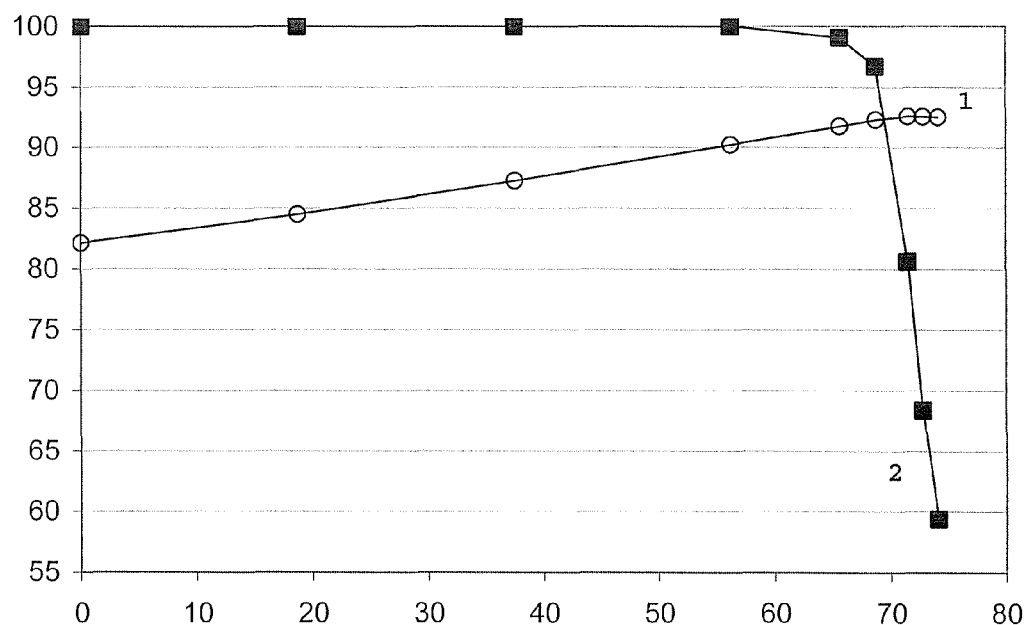

Other possible alternatives of the installation are visible in FIG. 3. They may be provided independently of each other or jointly. They may also be provided independently of the alternatives described earlier in connection with FIG. 1 or FIG. 2, or jointly with the latter.

A first possible alternative consists of providing, between the absorption column 2 and the first regenerator 11, a flash expansion chamber 51 fed by the rich absorbing solution withdrawal conduit 4. At the outlet of the flash expansion chamber 51 are connected: a conduit 52 for withdrawing flashed gases on the one hand, and a conduit 53 for withdrawing an expanded absorbing solution on the other hand, which feeds the head of the first regenerator 11. An additional reducing valve 5b is may then be provided at the inlet of the regenerator 11.

A second possible alternative consists of providing a conduit 61 for drawing off an absorbing solution at the absorption column 2. This absorbing solution drawing off conduit 61 feeds cooling means 62, at the output of which a cooled absorbing solution injection conduit 63 feeds the absorption column 2 in return. This second alternative is an intermediate cooling system at the absorption column 2, for example located in an approximately median position on the column.

A third possible alternative consists of providing that the cooled absorbing solution injection conduit 63 is entirely or partly fed by an absorbing solution bypass conduit 64. This absorbing solution bypass conduit 64 may be fed:

by a bypass 64a connected on the expanded absorbing solution withdrawal conduit 53, cooling means 65a and a pump 66a being provided on said bypass 64a; or by a bypass 64b connected on the conduit 13 for conveying liquid from the first regenerator 11 to the second regenerator 21, cooling means 65b and a pump 66b being provided on said bypass 64b; or by a bypass 64c connected on the conduit 23 for conveying a liquid from the second regenerator 21 to the third regenerator 31, cooling means 65c and a pump 66c being provided on said bypass 64c; or by a bypass 64d directly connected at the foot outlet of the additional absorption column 43 (which may optionally capture the totality of the outgoing flow), cooling means 65d and a pump 66d being provided on said bypass 64d; or by a combination of one or more of the bypasses 64a, 64b, 64c, 64d.

The cooling means 65a, 65b, 65c and/or 65d on the one hand and the pumps 66a, 66b, 66c and/or 66d on the other hand may be common in the case of a combination of several bypasses. But they are preferably separate as the temperature and pressure conditions are generally different in each bypass. The cooling means 65a, 65b, 65c and/or 65d may comprise a heat exchanger using an external medium (air, water, seawater.) and optionally for the cooling means 65b and 65c, upstream from the latter, a heat exchanger with the absorbing solution (heat exchange being carried out for example with the liquid flowing in the conduit 4 for withdrawing a so-called rich absorbing solution), for energy optimization purposes. When such a heat exchanger with the absorbing solution is provided, the heat exchanger may optionally be placed by using an external medium after the pump 66b or 66c, and one may optionally provide that this or these heat exchangers using an external medium are common with the cooling means 62.

Energy coupling is moreover possible between the heating means 12, 22, 32 and the cooling means 62, 65a, 65b, 65c and/or 65d. The installation of the invention may for example be integrated into a liquefied natural gas production plant, or even onto an off-shore platform. It allows the application of the method according to the invention.

Process for Treating a Gas Mixture Comprising Acid Gases

The invention allows the treatment of a gas mixture, notably of natural gas. The following description considers the case of natural gas, but another type of gas mixture containing acid gases may also be treated by the method of the invention. For example fumes may be treated using the method of the invention.

Natural gas contains acid gases, in particular hydrogen sulfide and/or carbon dioxide and/or carbonyl sulfide, the totality in volume amounts for example: 0 to 60% of $H_2S$, 0 to 80% of $CO_2$ and 0 to 100 ppm of COS. Mercaptans (R—SH) and carbon disulfide ($CS_2$) may also be present in the gas mixture. Advantageously the content of each of the aforementioned gases is substantially reduced by the method subject matter of the invention. Natural gas, after the de-acidification step by contacting with the absorbing solution, may subsequently be dehydrated. It is then optionally available for distribution in the natural gas network. Moreover, natural gas after de-acidification and dehydration may undergo subsequent treatments for its liquefaction, so that it is possible to obtain liquefied natural gas.

The absorbing solution used in the scope of the invention may be a chemical, physical or physico-chemical absorption solution. Preferably, this is a chemical or physico-chemical absorption solution. All the absorbing solutions known for their capacity of absorbing acid gases mixed with hydrocarbons may be used.

Preferably, the absorbing solution is an amine-based solution, notably alkanolamine based. As such, alkanolamine may notably be selected from the group of monoethanolamine (MEA), diglycolamine (DGA), diisopropanolamine (DIPA), diethanolamine (DEA), methyldiethanolamine (MDEA), activated methyldiethanolamine (for example enriched with hydroxyethyl piperazine or piperazine), triethanolamine (TEA), sterically hindered amines and their mixtures. Preferably, an alkanolamine is mixed with water and optionally with a physical solvent. Any known physical solvent is suitable for this purpose, and notably sulfolane. Thus, according to a particular embodiment, the absorbing solution comprises a mixture of DIPA, of water and sulfolane, or of MDEA, water and sulfolane.

Another type of particularly advantageous physical solvent is formed by $C_2$-$C_4$ thioalkanols of formula R—S—$C_{2-4}$—OH wherein R is any group, for example an alkyl group or an alcohol group or a thiol group or an alkylthio alkanol group, the group notably containing up to 6 carbon atoms. Thiodiglycol (TDG) is a particularly preferred physical solvent. This is the compound of formula $S(CH_2$—$CH_2$—$OH)_2$. In addition to TDG, other $C_2$-$C_4$ thioalkanols may be used according to the invention, notably methylthio ethanol or even dimeric molecules and notably ethylene-dithioethanol, of formula (HO—$CH_2$—$CH_2$)—S—($CH_2$—$CH_2$)—S—($CH_2$—$CH_2$—OH). In this respect, reference is made here to French Patent Application No. 06/00448, filed on Jan. 18, 2006 and published under No. 2,896,244 and to the International Application No WO 2007/083012.

According to a first preferred embodiment, the absorbing solution comprises:
  about 20 to about 60% by weight of diethanolamine; and
  about 40 to about 80% by weight of water.

According to a second preferred embodiment, the absorbing solution comprises:
  about 20 to about 60% by weight of methyldiethanolamine; and
  about 40 to about 80% by weight of water.

According to a third preferred embodiment, the absorbing solution comprises:
  about 20 to about 60% by weight of activated methyldiethanolamine; and
  about 40 to about 80% by weight of water.

According to a fourth particularly preferred embodiment, the absorbing solution comprises:
  about 20 to about 60% by weight of diethanolamine;
  about 20 to about 60% by weight of water; and
  about 10 to about 40% by weight of thiodiethylene glycol;
  or, more advantageously:
  about 30 to about 45% by weight of diethanolamine;
  about 30 to about 50% by weight of water; and
  about 15 to about 30% by weight of thiodiethylene glycol;
  or, even more advantageously:
  about 40% by weight of diethanolamine;
  about 40% by weight of water; and
  about 20% by weight of thiodiethylene glycol.

According to a fifth particularly preferred embodiment, the absorbing solution comprises:
  about 20 to about 60% by weight of methyldiethanolamine;
  about 20 to about 60% by weight of water; and
  about 10 to about 40% by weight of thiodiethylene glycol.

According to a sixth particularly preferred embodiment, the absorbing solution comprises:
  about 20 to about 60% by weight of activated methyldiethanolamine;
  about 20 to about 60% by weight of water; and
  about 10 to about 40% by weight of thiodiethylene glycol.

The use of the thioalkanol co-solvent and more particularly of TDG, is advantageous because it allows removal of a significant portion of the mercaptans contained in the gas mixture to be processed.

The natural gas to be treated, flowing upwards in the absorption column 2, is contacted with the absorbing (so-called poor) solution flowing downwards. The absorbing solution absorbs most of the acid gases and the treated natural gas is recovered. The temperature in the column is comprised between about 20 and about 100° C., preferably about 40 and about 90° C. The pressure in the column is comprised between 1 and 150 bar, preferably between 40 and 100 bar gage pressure. The operation is carried out at a gas mixture flow rate between $0.23 \times 10^6$ Nm$^3$/day and $56 \times 10^6$ Nm$^3$/day and an absorbing solution flow rate between 800 and 100,000 m$^3$/day. The thereby treated (de-acidified) natural gas then undergoes other subsequent treatment steps, for example a liquefaction step for producing liquefied natural gas.

The absorbing solution loaded with acid gases, or rich absorbing solution, is moreover regenerated. A preliminary and optional step for regeneration consists in the flash expansion of the absorbing solution within the flash expansion chamber 51. After this flash expansion, the absorbing solution is at a temperature comprised between 30° C. and 90° C., and at a pressure comprised between 10 bar gage pressure and 30 bar gage pressure. Flashed gases are recovered by the simple effect of pressure difference. These flashed gases may be treated downstream, notably for recovering a possible hydrocarbon fraction contained in the flashed gases, in addition to the acid gases.

Next, the absorbing solution enters the first regenerator 11 or high pressure regenerator, which for example operates at a pressure between 5 and 20 bar gage pressure (first regeneration step). The temperature is preferably as high as possible while being less than the chemical or thermal degradation temperature of the absorbing solution. For example, this temperature may be comprised between 90° C. and 150° C., preferably it may be about 130° C. At the outlet of the first regenerator 11, high pressure acid gases are recovered, which is advantageous in the perspective of subsequent use of the acid gases in systems of reinjection into wells, since this subsequent use requires compression of the acid gases. This compression is therefore less significant in the present case than in a standard installation.

The absorbing solution, degassed in the first regenerator 11, undergoes second degassing in the second regenerator 21 or medium pressure regenerator, after having been expanded at the reducing valve 14. This second regeneration step for example is carried out at a pressure between 2 and 6 bar gage pressure. Here again, the temperature is preferably as high as possible but less than the chemical and thermal degradation temperature of the absorbing solution. For example, this temperature may be comprised between 90° C. and 150° C., preferably it may be about 130° C.

The absorbing solution, degassed in the second regenerator 21, undergoes third degassing in the third regenerator 31 or low pressure regenerator, after having been expanded at the reducing valve 24. This third regeneration step is for example carried out at a pressure between 0.5 and 1.5 bar gage pressure. The temperature is preferably the boiling temperature of the absorbing solution at the regeneration pressure, and is less than the chemical and thermal degradation temperature of the absorbing solution. For example, this temperature may be comprised between 90° C. and 150° C., preferably it may be about 130° C.

The temperature at the first and at the second regeneration step (first and second regenerator) is generally less than the boiling temperature of the absorbing solution, because of the relatively high operational pressure. On the other hand, the temperature at the third regeneration step (third regenerator) is generally equal to the boiling temperature of the absorbing solution, because of the lower operational pressure. Thus, with the staged regeneration which is the subject matter of the invention, the drawback of the standard installation may be overcome, wherein thermal regeneration is directly carried out at low pressure in order to benefit from boiling, which proves to be disadvantageous insofar that the recovered acid gases should then undergo significant recompression before being reinjected into the deposit.

The temperature at each step is maintained by providing heat. This provision of heat is optionally carried out with heating means 12, 22, 32 when they are present, and in any case partly by injecting recompressed gases from the third regenerator 31 to the second regenerator 21 and from the second regenerator 21 to the first regenerator 11. Energy savings are therefore made on the heating means. The total energy gain at the whole installation is of the order of 10%. After the third regeneration step, the absorbing solution is completely regenerated (giving the so-called poor solution) and may be reused for absorbing acid gases. It is obvious that the invention may also be applied with four or more regeneration steps (four regenerators).

According to an alternative embodiment of the invention, it is possible to take off a portion of the acid gases after the third regeneration step (or even optionally after the second regeneration step). These acid gases are rich in $H_2S$, i.e. the $H_2S/CO_2$ molar ratio is higher therein than in the initial gas mixture to be treated. Conversely, the acid gases recovered at the first regeneration step are rich in $CO_2$, i.e. the $H_2S/CO_2$ molar ratio is lower therein than in the initial gas mixture to be treated. Thus, according to this alternative embodiment, the acid gases $H_2S$ and $CO_2$ are separated selectively.

Preferably, the $H_2S$-rich fraction of acid gases comprises more than 90%, more preferably more than 95%, or even more than 99% of $H_2S$. Preferably, the $CO_2$-rich gas mixture comprises more than 50%, more than 60%, more than 70% or more than 80% of $CO_2$. More preferably, it comprises more than 90% of $CO_2$, or even more than 95% of $CO_2$ and ideally is between 95 and 98% of $CO_2$.

If a post-treatment of the gas mixture rich in carbon dioxide is provided, in order to increase the $CO_2$ purity and to provide a gas mixture, said to be "very rich" in carbon dioxide, this gas mixture which is very rich in carbon dioxide comprises more than 50%, more than 60%, more than 70% or more than 80% of $CO_2$. More preferably, it comprises more than 90% of $CO_2$, or more than 95% of $CO_2$, and ideally is between 95 and 98% of $CO_2$. All the gas content percentages are volume percentages unless indicated otherwise.

Preferably, the selectivity factor $([H_2S]_1+[CO_2]_2)/([CO_2]_1+[H_2S]_2)$, wherein $[H_2S]_1$ represents the $H_2S$ volume concentration in the $H_2S$-rich fraction, $[CO_2]_1$ represents the $CO_2$ volume concentration in the $H_2S$-rich fraction, $[H_2S]_2$ represents the $H_2S$ volume concentration in the $CO_2$-rich fraction, and $[CO_2]_2$ represents the $CO_2$ volume concentration in the $CO_2$-rich fraction, is greater than 15. More preferably, this selectivity factor is greater than 30 and ideally it is greater than 60.

Obtaining this effect assumes the use of an absorbing solution having better affinity for hydrogen sulfide than for carbon dioxide, which is notably the case with an absorbing solution based on MDEA or activated MDEA, and to a certain extent with a solution based on DEA, or even with an absorbing solution based on a DEA/TDG or MDEA/TDG or activated MDEA/TDG mixture. Given that the compressed gases from the lower regeneration stage are enriched in $H_2S$, their reinjection into the upper stage has the effect of driving away a portion of the $CO_2$ contained in the absorbing solution to the benefit of $H_2S$. A temperature of 100-130° C. and a pressure of 5-20 bar gage constitute particularly favorable conditions for selective separation of $CO_2$ and $H_2S$. Selective separation is useful because it provides specific treatment of hydrogen sulfide, for example within a sulfur production Claus converter, and the specific use of carbon dioxide, for example for improving recovery of hydrocarbons (EOR) i.e. reinjection under pressure into wells. The $H_2S$-rich fraction is significantly free of hydrocarbons, and notably of aromatic substances (BTEX), which are a problem for Claus converters. Additionally, if the $H_2S$ is not intended to be put to use and should be confined in the subsoil, selectivity does not allow space to be wasted in the subsoil with carbon dioxide.

Standard selective separation processes which use two separated circuits with two distinct absorbing solutions are more expensive than the present method. Selective separation may be improved by treating the recovered acid gases in the first regeneration step (outlet of the first regenerator 11) with the poor absorbing solution (see the additional absorption column 43 in the installations of FIGS. 2 and 3). Thus, the larger part of the residual $H_2S$ portion present at this stage is recycled in the circuit for regenerating the absorbing solution, whereas the finally recovered portion of non-absorbed acid gases is further enriched with $CO_2$.

The additional absorption column 43 operates at a pressure greater than or equal to that of first regenerator 11 and at a temperature comprised between 20° C. and 90° C., preferably as low as possible, for example between 20 and 50° C. or ideally between 20 and 30° C. It is also possible to carry out the treatment of the recovered acid gases in the first regeneration step (a fraction rich in carbon dioxide) by means of a standard distillation column $CO_2/H_2S$ instead of the additional absorption column 43.

The purity level of the $CO_2$-rich fraction on the one hand, and of the $H_2S$-rich fraction on the other hand, mainly depends on four factors:

1) the ratio of $CO_2/H_2S$ volume concentrations at the inlet of the system;
2) the proportion of total $H_2S$ which is taken off in the $H_2S$-rich fraction (or the sharing coefficient, at the head outlet of the third regenerator, between the portion which is drawn off from the system and the portion which is reinjected and recompressed towards the upper stage);
3) the presence or the absence of a treatment of the $CO_2$-rich fraction;
4) operating pressure and notably the operating pressure of the first regenerator.

The system operating parameters (temperature, pressure, absorbing solution) and the choice of equipment (regenerators) also have an influence.

As regards the factor 2), i.e. the influence of the total $H_2S$ proportion which is drawn off in the $H_2S$-rich fraction (or of the sharing coefficient at the head outlet of the third regenerator), it is noted that the larger the flow rate of the $H_2S$-rich fraction, more the $CO_2$ content of the $CO_2$-rich fraction is increased, but more the $H_2S$ purity of the $H_2S$-rich fraction is degraded. This phenomenon is illustrated in FIGS. 4 to 8. In order to obtain optimum selective separation of $CO_2$ and $H_2S$, it is generally suitable to take off between 40 and 90% of the total $H_2S$ amount present in the system, preferably between 50 and 80%, more preferably between 65 and 75%. This corresponds advantageously to a withdrawal of 10 to 70%, preferably 15 to 50%, of the volume taken off by the withdrawal line 37 as compared with the total flow exiting from the head of the third regenerator (sharing coefficient). However, one skilled in the art will appreciate that it is possible to adapt or to change the values above depending on other relevant parameters, and notably depending on the factors 1) and 3) mentioned above.

In particular, in order to obtain the desired selective separation, it is preferred to resort to a treatment of the $CO_2$-rich fraction when the $CO_2/H_2S$ volume concentration ratio at the inlet of the system is less than 10, particularly when it is less than 8, more particularly when it is less than 6, and most particularly when it is less than 4. Correlatively, according to the desired purity for each of both fractions, it is advantageously possible to do without the treatment of the $CO_2$-rich fraction when the $CO_2/H_2S$ volume concentration ratio at the inlet of the system is greater than 4, particularly when it is greater than 6, more particularly when it is greater than 8, and most particularly when it is greater than 10.

This is illustrated by the five examples below. In these examples, an amine feedstock ratio of about 0.5 mol/mol at the bottom of the absorber and operating pressures of respectively 14, 4 and 1 bar gage operating pressures at the first, second and third regenerators were employed. As a first example, if the $CO_2/H_2S$ volume concentration ratio at the inlet of the system is equal to 0.5, and in the absence of treatment of the $CO_2$ flow (see FIG. 4), by withdrawing the totality of the flow at the head of the low pressure regenerator (third regenerator) at best 82% of the incoming $H_2S$ may be recovered and a $CO_2$ flow with only 57% of $CO_2$ may be produced.

As a second example, if the $CO_2/H_2S$ volume concentration ratio at the inlet of the system is equal to 1 (see FIG. 5) and without treatment of the $CO_2$ flow, it is of value to withdraw 65% of the initial $H_2S$ which leads to an $H_2S$ flow with 94% purity and a $CO_2$ flow with 72% purity. This corresponds to a 50% sharing coefficient at the head of the low pressure regenerator. Increasing withdrawal beyond this value does not allow any significant improvement in the quality of the $CO_2$ flow (without any supplementary treatment) and this rapidly degrades the quality of the $H_2S$ flow because it is the $CO_2$ portion in this flow which increases. Conversely, below this value, the $H_2S$ content in the $CO_2$ flow is larger and increases when the withdrawal flow is reduced. The $H_2S$ flow remains with an unchanged, quasi-pure composition.

As a third example, if the $CO_2/H_2S$ volume concentration ratio at the inlet of the system is equal to 3 (see FIG. 6), and without treatment of the $CO_2$ flow, the optimum point is located at about 74% of the initial $H_2S$ drawn-off (40% sharing coefficient), which leads to an $H_2S$ flow with 99% purity and to a $CO_2$ flow with 83% purity. As a fourth example, if the $CO_2/H_2S$ volume concentration ratio at the inlet of the system is equal to 5 (see FIG. 7), and without treatment of the $CO_2$ flow, the optimum point is located at about 69% of the initial $H_2S$ drawn-off (25% sharing coefficient), which leads to an $H_2S$ flow with 99% purity and to a $CO_2$ flow with 89% purity. As a fifth example, if the $CO_2/H_2S$ volume concentration ratio at the inlet of the system is equal to 8 (see FIG. 8), and without treatment of the $CO_2$ flow, drawing off 66% of the initial $H_2S$ (18% sharing coefficient), leads to better qualities of products: 99% for $H_2S$ and 92% for $CO_2$. The quality of the $CO_2$ flow is then of particular interest for use in EOR.

Thus, for $CO_2/H_2S$ ratios at the inlet less than 8, the quality of the $CO_2$ flow is not optimum and preferably requires complementary treatment, for example washing with a portion of the regenerated solvent. Beyond this ratio, the $CO_2$ flow will only contain a few % of $H_2S$ which is compatible with EOR re-injection. In every case, by the presence of a treatment of the $CO_2$ flow it is almost possible to recover the totality of $H_2S$ present in the absorbing solution at the $H_2S$ outlet flow.

As regards factor 4), in other words the influence of operating pressure in the first regenerator, it is preferable to operate at high pressure in order to improve separation quality. Thus, a pressure in the first regenerator comprised between 10 and 20 bar gage, preferably between 12 and 18 bar gage, and more particularly preferably close to 14 bar gage pressure, allows better selective separation. By way of example, for a $CO_2/H_2S$ ratio of 1 at the inlet, it is possible to recover about 74% of the entering $H_2S$ in a 90% purity flow with a high-pressure regenerator operating at 14 bar gage pressure, as against 67% with a 7 bar gage pressure. Similarly, for a $CO_2/H_2S$ ratio of 3, it is possible to recover 78% of entering $H_2S$ in a 90% purity flow with a high pressure regenerator operating at 14 bar gage pressure as against 71% at 7 bar gage pressure. In conclusion, for a given quality of $H_2S$ flow, the fact of going from 7 bar to 14 bar gage pressure makes it possible to recover around 10% more $H_2S$ (and, additionally, to improve the quality of the associated $CO_2$ flow). Nevertheless, the fact of increasing high-pressure regenerator pressure does imply a consequent adaptation of compression power and compressor size. A pressure of around 14 bar gage is a good trade-off in view of the compression values to be preserved between stages, and taking account of the class of conduit generally employed.

According to an alternative embodiment of the invention, it is possible to cool the gases from the third regenerator (respectively from the second regenerator) and to separate the condensation water before recompression. Thus, it is possible to operate the compressors in suitable parameter ranges (notably as regards the capacity of the compressors and the strength of the materials). This cooling imposes an increase in the power of the reboilers at the regenerators, but the corresponding excess power consumption is partly compensated by the reduction of the compression power (as condensed water is not recompressed, the flow rate in the compressors is less). Further, opting for such cooling does not influence the quality of the selective separation of the $H_2S$ and $CO_2$ gases. If such cooling is present, it may be suitable to lower the temperature at the inlet of the compressors (suction) down to 20-60° C. (versus 90-120° C. without cooling). The outlet temperature of the compressors (discharge) is correlatively cooled down to 140-180° C. (versus 200-260° C. without cooling).

Table 1 below as an example shows a comparison (from numerical simulations) between the operation of the second and third regenerators with and without the cooling described above.

TABLE 1

Comparative Operation With And Without Cooling At The Inlet Of The compressors

| Cooling at the inlet of the compressor towards the upper stage | Second regenerator | | Third regenerator | |
| --- | --- | --- | --- | --- |
| | Yes | No | Yes | No |
| P suction (bar gage) | 3.7 | 3.7 | 0.9 | 0.9 |
| T suction (° C.) | 55 | 115 | 55 | 111 |
| P discharge (bar gage) | 14.1 | 14.1 | 3.9 | 3.9 |
| T discharge (° C.) | 170 | 250 | 170 | 250 |
| Composition (mol %) $CO_2/H_2S/H_2O$ | 67/29/3 | 44/17/38 | 3/88/8 | 1/34/64 |
| Flow rate (m³/hr) | 1,378 | 2,500 | 7,938 | 24,210 |
| Power of the compressor (kW) towards the upper stage | 753 | 1 403 | 460 | 1 380 |
| Reboiling power (MW) of the upper stage | 12.2 | 7.4 | 6.5 | 0 |
| Internal refrigerating power (kW), e.g. air refrigerant | 70 | 0 | 140 | 0 |

According to an alternative embodiment of the invention, the efficiency of the method is further improved by drawing off a portion (or even the totality) of the absorbing solution during the absorption step in the absorption column 2, by cooling the absorbing solution and by putting it again into contact with the gas mixture to be treated in the absorption column 2. Drawing off and reinjection are carried out in an intermediate position between the foot and the head of the column, for example approximately at the middle of the column. By lowering the temperature of the absorbing solution during absorption, it is possible to increase the loading rate of the absorbing solution at the bottom of the column. Correlatively, the flow rate of absorbing solution may be reduced, for example by about 10% for treating gases with high acid gas content.

Moreover, a compressed and cooled semi-rich absorbing solution may be used for feeding the absorption column 2 (in its middle) either in combination or not with the absorbing solution drawn off on the absorption column 2 and cooled, the semi-rich absorbing solution being obtained either after the flash expansion step, or after the first or second regeneration step, or still after the step for treating recovered acid gases after the first regeneration step. The semi-rich solution may still be a flow combination corresponding to these various origins.

The invention claimed is:

1. A method for treating a gas mixture containing acid gases, comprising:
   contacting the gas mixture with an absorbing solution, by which a de-acidified gas mixture and an absorbing solution loaded with acid gases may be obtained; and
   regeneration of the absorbing solution loaded with acid gases;
   wherein the regeneration comprises the following steps:
      passing the absorbing solution into a first regenerator at a first pressure;
      passing the absorbing solution into a second regenerator at a second pressure, less than the first pressure;
      compressing the gases from the second regenerator and recycling the thereby compressed gases to the first regenerator;
      subsequent to passing into the second regenerator, passing the absorbing solution into a third regenerator at a third pressure less than the second pressure; and
      compressing the gases from the third regenerator and recycling the thereby compressed gases to the second regenerator;
   wherein at least a portion of the gases from the second or the third regenerator is drawn off in order to provide a gas mixture rich in hydrogen sulfide and at least a portion of the gases from the first regenerator is drawn off in order to provide a gas mixture rich in carbon dioxide.

2. The method according to claim 1, wherein the first pressure is comprised between 5 and 20 bar gage pressure, the second pressure is comprised between 2 and 6 bar gage pressure, and the third pressure is comprised between 0.5 and 1.5 bar gage pressure.

3. The method according to claim 1, wherein at least one of the first, the second and the third regenerator is heated.

4. The method according to claim 1, wherein the absorbing solution is not boiling in the first regenerator and the second regenerator and is boiling in the third regenerator.

5. The method according to claim 1, wherein during the step for contacting the gas mixture with the absorbing solution, a portion of the absorbing solution is drawn off, cooled and put back into contact with the gas mixture.

6. The method according to claim 1, wherein the absorbing solution undergoes flash expansion before passing into the first regenerator.

7. The method according to claim 1, wherein at least one portion of an absorbing solution selected from the group comprising a portion of the absorbing solution obtained from the flash expansion, a portion of the absorbing solution obtained after passing into the first regenerator and a portion of the absorbing solution obtained after passing into the second regenerator is cooled and put into contact with the gas mixture.

8. The method according to claim 1, wherein the gas mixture is based on hydrocarbons.

9. The method according to claim 1, wherein the gas mixture rich in carbon dioxide is contacted with at least a portion of the absorbing solution from the second or the third regenerator, in order to provide a gas mixture very rich in carbon dioxide, the absorbing solution obtained after this contacting, then undergoing regeneration or being cooled and put into contact with the gas mixture.

10. The method according to claim 1, wherein the absorbing solution comprises:
   at least one alkanolamine;
   optionally a $C_2$-$C_4$ thioalkanol; and
   water.

11. The method according to claim 1, wherein the absorbing solution comprises:
   at least one alkanolamine;
   optionally sulfolane; and
   water.

12. The method according to claim 1, further comprising the following step:
   dehydration of the de-acidified gas mixture.

13. The method according to claim 1, wherein the gas mixture rich in hydrogen sulfide comprises more than 90% of hydrogen sulfide or the gas mixture rich in carbon dioxide comprises more than 90% of carbon dioxide.

14. The method according to claim 1, wherein the gas mixture rich in hydrogen sulfide is withdrawn from the third regenerator in an amount of from 10 to 70%-compared with the total flow exiting from the head of the third regenerator.

15. The method according to claim 1, wherein at least a portion of the gases from the second and the third regenerator is drawn off in order to provide a gas mixture rich in hydrogen sulfide and at least a portion of the gases from the first regenerator is drawn off in order to provide a gas mixture rich in carbon dioxide.

16. The method according to claim 8, wherein the gas mixture is natural gas.

17. The method according to claim 13, wherein the gas mixture rich in hydrogen sulfide comprises more than 90% of hydrogen sulfide and the gas mixture rich in carbon dioxide comprises more than 90% of carbon dioxide.

* * * * *